Patented May 21, 1940

2,201,200

UNITED STATES PATENT OFFICE 2,201,200

PROCESS OF PREPARING THIOLACTAMS

Paul Swithin Pinkney, Wilmington, Del., assignor to E. I. du Pont de Nemours & Company, Wilmington, Del., a corporation of Delaware No Drawing. Application April 4, 1938, Serial No. 199,988. Renewed August 4, 1939

9 Claims. (Cl. 260—239)

This invention relates to the preparation of organic compounds and more particularly to the preparation of thiolactams.

Thiolactams have hitherto been made from lactams by treatment with phosphorus sulfides—see Ber. 38, 1592 (1905); Ber. 40, 2844 (1907); and D. R. P. 611 248. These processes, however, possess certain disadvantages, among them the formation of complex mixtures of products which are difficult to separate.

This invention has as an object the provision of a new and improved process for the preparation of certain thiolactams. Further objects will appear hereinafter.

These objects are accomplished by the following invention wherein hydrogen sulfide is reacted with a primary monoaminomononitrile wherein the amino group is attached to a carbon atom bearing at least one hydrogen atom and is separated from the nitrile group by a chain of from three to five carbon atoms, inclusive. There are thus obtained thiolactams in which the annular atoms in the thiolactam ring consist of the nitrogen atom and from four to six carbon atoms depending on the particular aminonitrile used, i. e., a total of from five to seven annular atoms.

The more detailed practice of the invention is illustrated by the following examples showing preparation of the lactam of 6-aminothiocaproic acid under various conditions. Parts given are by weight. There are of course many forms of the invention other than these specific embodiments. For example, other thiolactams of the aforesaid type may be prepared in an analogous manner.

Example I

Twenty-two and four tenths (22.4) parts of 6-aminocapronitrile and 110 parts of ethyl alcohol were placed in a pressure vessel and saturated with hydrogen sulfide while the vessel was cooled in an ice bath. The vessel was sealed and heated for eight hours at 100° C., after which it was cooled in an ice bath and opened. The yellow solution was poured into a vessel and stirred. White crystals of the lactam of 6-amonothiocaproic acid, M. P. 106–107° C., were obtained. The yield was 15 parts or 58% of the theoretical.

Example II

Seventy (70) parts of 6-aminocapronitrile was placed in a suitable container, and hydrogen sulfide was passed into the liquid for about one hour. During the first twenty minutes the temperature of the liquid rose to 80° C. During the last forty minutes the container was heated so that the temperature of the liquid rose gradually to 140° C. During this time ammonia was evolved, and the liquid became viscous. It was taken up in 150 parts of hot ethyl alcohol and the solution cooled. The desired thiocaprolactam separated as a white crystalline compound, which was filtered off and dried. The dry product melted at 104–105° C. and showed a mixed melting point of 105–106° C. with a known sample of the lactam of 6-aminothiocaproic acid.

The 6-aminocapronitrile used in the above examples may be obtained in any suitable manner, as by heating cyclohexanone oxime with ammonia in the presence of silica gel.

In this process, the temperature may range from that at which the reaction begins to be detectable, usually around 50° C., up to the decomposition temperature of the reactants, which may be as high as 250° C. and in some instances even higher. Best results are usually obtained in closed systems under superatmospheric pressure in the presence of diluents which have been saturated with hydrogen sulfide (Example I), though the reaction may also be conducted at atmospheric pressure and in the absence of a diluent (see Example II). Preferably the process is carried out in the liquid phase. However, if the desired thiolactam is sufficiently stable under the pressures and temperatures required for volatilization of the aminonitrile, the process may with some degree of success be carried out in the vapor phase.

The process is not limited to the ratio of reactants disclosed in the examples given. However, a slight excess of hydrogen sufide is preferably used. The above-referred to liquid diluent, if used, should be chemically inert to reactants and product and a solvent for the reactants, but may be a solvent or non-solvent for the product. Suitable diluents include n-butyl alcohol, the amyl alcohols, dioxan, toluene, xylene, benzene, β-methoxyethanol, ethyl alcohol, diethyl ether, and chlorobenzene.

In the examples above, the seven-membered ring compound, the lactam of 6-aminothiocaproic acid, is obtained. In general, 6-aminonitriles lead to seven membered rings. Similarly, 4-aminonitriles, such as 4-aminobutyro-, valero-, capro-, etc., nitriles lead to thiolactams which contain five-membered rings. Likewise, 5-aminonitriles, such as 5-aminovalero-, capro-, etc., nitriles lead to thiolactams which contain six-membered rings. The numbers used in the naming of the aminonitriles refer to the number of the carbon atom in the chain, the carbon of the nitrile group being number 1.

From my experience with the present process, exemplified above in the case of 6-aminocapronitrile, I am of the opinion that there may be used in the practice of the invention any primary monoaminomononitrile wherein the amino group is attached to a carbon atom bearing at least one hydrogen atom, and is separated from the nitrile (-CN) group by a chain of from three to five carbon atoms, not more than two of which (if the chain is closed) are atoms of the same ring, said chain being free of acetylenic and allenic unsaturation. These are the essential elements of structure, and the remainder of the molecule is immaterial so long as no groups are present which interfere with the reaction. The aminonitrile as a whole may be aliphatic, alicyclic, aromatic, or heterocyclic, and saturated or unsaturated. If unsaturated, the unsaturation may be in a ring or open chain, and it may be ethylenic, dienic and (subject to above exception) acetylenic or allenic. Substituents other than the amino and nitrile group may be present e. g., chlorine, bromine, mercapto, and hydroxyl. However, I prefer to use primary monoaminomononitriles of the formula $H_2N-R-CN$, where R is an acyclic hydrocarbon radical free from acetylenic and allenic unsaturation and having a chain of three to five carbon atoms between the amino and cyano groups, the carbon attached to the amine group bearing at least one hydrogen atom. Most consistent results are obtained with those where R has the qualifications just given, and is in addition saturated.

Specific aminonitriles suitable for use in this invention include the following: o-cyanobenzylamine, 4-aminobutyronitrile, 4-aminocapronitrile, 4-aminolauronitrile, 4-aminostearonitrile, 5-aminovaleronitrile, 5-aminocapronitrile, 5-aminolauronitrile, 5-aminostearonitrile, 6-aminocapronitrile, 6-aminolauronitrile, 6-aminostearonitrile, 2-chloro-4-aminobutyronitrile, 3-chloro-5-aminovaleronitrile, 3-hydroxy-5-aminocapronitrile, 3, 4-dibromo-6-aminocapronitrile, 2-methyl-4-aminobutyronitrile, 3-ethyl-5-aminovaleronitrile, 4-isopropyl-6-aminocapronitrile, 2-chloro-3-hydroxy-4-methyl-5-aminocapronitrile, 5-amino-3-pentenonitrile, 5-amino-2-pentenonitrile, 5-amino-2,4-pentadienonitrile, o-(2-amino ethyl)-hexahydrobenzonitrile, 2-aminomethylcyclohexylacetanitrile, 3-(2-aminocyclohexyl)-propionitrile, o-(2-aminoethyl) benzonitrile, o-aminomethylphenylacetonitrile, 2-aminoethyl-1-naphthylacetonitrile, 8-aminomethyl-1-naphthonitrile, and 3-(2-aminoethyl) furonitrile.

The process of preparing thiolactams by treatment of lactams with phosphorus pentasulfide, as described in the prior art, yields a mixture of products which are difficult to separate. The process herein described is a very simple method for the synthesis of thiolactams. The products are generally obtained in good yields and may be readily separated by fractional crystallization from by-products and unchanged aminonitrile. This process can be carried out under a wide variety of conditions of pressure and temperature and in a wide variety of solvents. These variables may be adjusted for each particular aminonitrile to obtain the optimum yield of thiolactam or to comply with available operating facilities. Moreover, in many cases the aminonitrile necessary for the preparation of a certain thiolactam is much more easily obtained than the corresponding lactam.

The thiolactams prepared as described herein may be used for many purposes, e. g., as intermediates for the preparation of other compounds and as agents for controlling economically harmful lower forms of life.

The above description and examples are intended to be illustrative only. Any modification of or variation therefrom which conforms to the spirit of the invention is intended to be included within the scope of the claims.

I claim:

1. Process of preparing thiolactams which comprises reacting hydrogen sulfide with a primary monoaminomononitrile wherein the amino group is attached to a carbon atom bearing at least one hydrogen atom and is separated from the nitrile group by a chain of from three to five carbon atoms, not more than two of which are atoms of the same ring, said chain being free of acetylenic and allenic unsaturation.

2. Process of preparing thiolactams which comprises reacting hydrogen sulfide with an acyclic primary monoaminomononitrile wherein the amino group is attached to a carbon atom bearing at least one hydrogen atom and is separated from the nitrile group by a chain of from three to five carbon atoms, said chain being free of acetylenic and allenic unsaturation.

3. Process of preparing thiolactams which comprises reacting hydrogen sulfide with a compound of the formula $H_2N-R-CN$, where R is an acyclic hydrocarbon radical free of acetylenic and allenic unsaturation having a chain of from three to five carbon atoms between the nitrile and amino groups, the carbon attached to the nitrogen bearing at least one hydrogen atom.

4. Process of claim 3 wherein R is a saturated hydrocarbon radical.

5. Process of claim 3 wherein the reaction is conducted in a liquid diluent which is a solvent for the reactants and is chemically inert to reactants and product.

6. Process of preparing thiolactams which comprises reacting hydrogen sulfide with an aliphatic 6-aminonitrile in which the carbon atom attached to the amino nitrogen bears at least one hydrogen atom.

7. Process of preparing thiolactams which comprises reacting hydrogen sulfide with 6-aminocapronitrile.

8. Process of preparing thiolactams which comprises reacting hydrogen sulfide with 5-aminovaleronitrile.

9. Process of preparing thiolactams which comprises reacting hydrogen sulfide with 4-aminovaleronitrile.

PAUL SWITHIN PINKNEY.

CERTIFICATE OF CORRECTION.

Patent No. 2,201,200. May 21, 1940.

PAUL SWITHIN PINKNEY.

It is hereby certified that error appears in the printed specification of the above numbered patent requiring correction as follows: Page 1, first column, line 46, for "6-amonothio-" read -- 6-aminothio- --; page 2, first column, line 53, for "clohexylacetanitrile" read --clohexylacetonitrile--; line 55, for "2-aminoethyl" read -- 2-aminomethyl--; and that the said Letters Patent should be read with this correction therein that the same may conform to the record of the case in the Patent Office.

Signed and sealed this 30th day of July, A. D. 1940.

(Seal)

Henry Van Arsdale,
Acting Commissioner of Patents.